United States Patent Office 3,788,987
Patented Jan. 29, 1974

3,788,987
SOLID LUBRICANT ADDITIVES DISPERSED IN PERFLUOROALKYL ETHERS WITH PERFLUOROALKYL ETHER ACID DISPERSANTS
Philip Lee Bartlett, Wilmington, Del., assignor to E. I. du Pont de Nemours and Company, Wilmington, Del.
No Drawing. Filed Sept. 30, 1970, Ser. No. 76,979
Int. Cl. C10m 3/02, 3/24
U.S. Cl. 252—25                    10 Claims

ABSTRACT OF THE DISCLOSURE

Stable dispersions consisting essentially of from about 0.05 to about 10% by weight of a solid additive, from about 70 to 99.9% by weight of a polymeric hexafluoropropylene oxide fluid and from about 0.005 to about 20% by weight of a dispersing agent having the formula $$R'_fO[CF(CF_3)CF_2O]_yCF(CF_3)COOH$$

wherein $R'_f$ is a perfluoroalkyl radical having from 1 to 6 carbon atoms and $y$ is from about 3 to about 40 and the process of preparing these dispersions by dispersing the solid additive in the hexafluoropropylene oxide fluid in the presence of the dispersing agent.

BACKGROUND OF THE INVENTION

(1) Field of the invention

This invention relates to novel stable dispersions consisting essentially of from about 0.05 to about 10% by weight of a solid additive, from about 70 to 99.9% by weight of a polymeric hexafluoropropylene oxide fluid having the formula $R_fO[CF(CF_3)CF_2O]_nCF(CF_3)X$ wherein $R_f$ is a perfluoroalkyl group having from 1 to 6 carbon atoms, $n$ is from 2 to about 40 and X is hydrogen or fluorine and from about 0.005 to about 20% by weight of a dispersing agent having the formula $$R'_fO[CF(CF_3)CF_2O]_yCF(CF_3)COOH$$

wherein $R'_f$ is a perfluoroalkyl radical having from 1 to 6 carbon atoms and $y$ is from about 3 to about 40. These stable dispersions are useful for example as lubricants even under severe conditions of temperature and pressure.

(2) Description of the prior art

Polymeric hexafluoropropylene oxide fluids having the general formula $R_fO[CF(CF_3)CF_2O]_nCF(CF_3)H$ and $R_fO[CF(CF_3)CF_2O]_nCF(CF_3)F$ have been found to function as useful fluids under severe environmental conditions. These polymeric hexafluoropropylene oxide fluids are characterized by the following properties: excellent oxidative and thermal stability; high degree of chemical inertness; wide viscosity range; good lubricity; low volatility; good dielectric properties; high shear stability; nonflammability; and low order of toxicity. The above properties render them particularly valuable for use in the formulation of hydraulic fluids and lubricants which may be applied and used under severe environmental conditions.

The polymeric hexafluoropropylene oxide fluid having the formula $R_fO[CF(CF_3)CF_2O]_nCF(CF_3)X$ is prepared by first polymerizing hexafluoropropylene oxide,

to $R'_fO[CF(CF_3)CF_2O]_nCF(CF_3)COF$ as described in U.S. 3,250,808. The acyl fluoride thus derived can then be hydrolyzed to the acid $$R'_fO[CF(CF_3)CF_2O]_nCF(CF_3)COOH$$

as also described in the above patent. The nature of $R_f$ is determined by the compound used in conjunction with the fluoride catalyst in the polymerization of hexafluoropropylene. If fluoride ion alone is used, $R'_f$ is $$CF_3CF_2CF_2-;$$

if a perfluoroaliphatic acyl fluoride such as $C_aF_{2a+1}COF$ wherein $a$ is from 0 to 5 is used with the fluoride ion then $R'_f$ is a perfluoroalkyl radical of 1 to 6 carbon atoms; if perfluoroketone $R''_fCOR'''_f$ is used wherein $R''_f$ and $R'''_f$ are perfluoroalkyl radical and the sum of the carbon atoms in $R''_f$ and $R'''_f$ is between 2 and 5, then $R'_f$ is a perfluoroalkyl radical of $R''_fR'''_fCF-$.

The polymeric hexafluoropropylene oxide fluid can then be obtained by decarboxylating the above polymeric hexafluoropropylene oxide acid, e.g., as in U.S. 3,342,875 to yield the compound $R_fO[CF(CF_3)CF_2O]_nCF(CF_3)H$. The polymeric hexafluoropropylene oxide acid may also be treated with elemental fluorine to yield fluoro-end-capped material $R_fO[CF(CF_3)CF_2O]_nCF_2CF_3$ as described in U.S. 3,242,218. The latter fluoro-end-capped material may also be obtained directly from the acyl fluoride by treating said acyl fluoride with antimony pentafluoride in the temperature range of 25 to 250° C.

While the above-mentioned fluids are excellent lubricants, etc., particularly under extreme pressure conditions, it is often desirable to enhance their range of usefulness beyond that which is characteristic of the fluids. One of the known processes for increasing the range of usefulness of fluids, e.g., lubricant fluids for use under high temperature and pressure, is to incorporate into the fluid substances which may be characterized as solid additives, thus forming stable dispersions.

In general, stable dispersions of solid in the fluids may be prepared by grinding the solid in a ball mill to a colloidal size (10 to 10,000 A.; 0.001 micron to 1 micron) in the fluid, in the presence of a dispersing liquid and a grinding agent which prevents agglomeration or welding of the minute particles as grinding progresses. See for example, U.S. 2,315,572. In some instances the grinding agent also functions as a dispersing liquid. This process is, however, time consuming and often ineffective when it is sought to disperse the solids in the polyfluorinated fluids with which we are concerned because an effective grinding agent for use in polyfluorinated fluids is unknown.

Stable dispersions may also be formed by contracting very finely divided solid particles with a liquid medium in the presence of a dispersing agent. This process is however, usually ineffective when the liquid medium is a polyfluorinated fluid because most of the ordinary dispersing agents are not useful in polyfluorinated fluids. In the usual solid dispersion in non-aqueous system, the dispersing agent is a surface active agent which is characterized by having one end of the molecule which is hydrophilic or polar and the other end of the molecule which is oleophilic. Thus in ordinary non-aqueous system, the hydrophilic or the polar end of the dispersant molecule is attached to the solid particle and the other end of the molecule which is oleophilic, being compatible with the liquid medium, stabilizes the dispersion. The polyfluorinated fluids set out above, however, are both hydrophobic and oleophobic so while the ordinary dispersing agent may be capable of interaction with the solid particles at the polar end of the molecule, the oleophilic end of the molecule would be incompatible with the polyfluorinated fluid, and thus no stable dispersion would be obtained.

Stable dispersions of solids in polyfluorinated fluids which are based on hexafluoropropylene oxide and a process for their preparation have now been discovered.

SUMMARY OF THE INVENTION

The present invention is directed to stable dispersions consisting essentially of (a) From about 0.05 to about 10% by weight of a solid additive having a particle size of from about 1 micron to about 40 microns, (b) From about 70 to 99.9% by weight of a polymeric hexafluoropropylene oxide fluid having the formula $$R_fO[CF(CF_3)CF_2O]_nCF(CF_3)X$$

wherein $R_f$ is a perfluoroalkyl group having from 1 to 6 carbon atoms, $n$ is from 2 to about 40 and X is hydrogen or fluorine, and (c) From about 0.005 to 20% by weight of a dispersing agents having the formula $$R'_fO[CF(CF_3)CF_2O]_yCF(CF_3)COOH$$

wherein $R'_f$ is a perfluoroalkyl radical having from 1 to 6 carbon atoms and $y$ is from 3 to about 40.

The process aspect of this invention is a process for preparing these stable dispersions which comprises dispersing from about 0.05 to about 10% by weight of a solid additive in polymeric hexafluoropropylene oxide fluid having the formula $R_fO[CF(CF_3)CF_2O]_nCF(CF_3)X$ wherein $R_f$ is a perfluoroalkyl group having from 1 to 6 carbon atoms, $n$ is from 2 to about 20 and X is hydrogen or fluorine in the presence of from about 0.005 to about 20% by weight of a dispersing agent having the formula $R'_fO[CF(CF_3)CF_2O]_yCF(CF_3)COOH$ wherein $R'_f$ is a perfluoroalkyl group having from 1 to 6 carbon atoms and $y$ is from 3 to about 40. The solid additives used in this process will have a particle size of from about 1 to about 40 microns diameter.

DESCRIPTION OF THE INVENTION

Polymeric hexafluoropropylene oxide fluids having the general formula $R_fO[CF(CF_3)CF_2O]_nCF(CF_3)H$ and $R_fO[CF(CF_3)CF_2O]_nCF(CF_3)F$ have been found to function as useful fluids under severe environmental conditions, e.g., as lubricants and in the formulation of hydraulic fluids.

While these polymeric hexafluoropropylene oxide fluids described above are useful fluids for severe applications, it is often desirable to increase their range of usefulness. In the modern technology of lubricating oils and lubricants, high quality is attained not only by improvement in the quality of the base stocks but also to a large degree by the addition of certain solid chemical compounds or additive agents to the base stocks. Most modern lubricant additives additives are:

(1) Designed to protect the finished lubricant in service, in one way or another by limiting chemical change or degradation;

(2) Designed to protect the equipment in which the lubricant is used from harmful combustion products or from failure of the lubricant to perform satisfactorily; and/or (3) Designed to improve existing physical properties of the lubricant or impart new characteristics to it.

The additives commonly used include oxidation inhibitors, corrosion inhibitors, anti-wear, improvers, detergents, dispersants, alkaline agents, rust inhibitors, pour depressants, viscosity improvers, oiliness agents, extreme pressure agents, anti-foam agents, solid lubricants, metal deactivators, color stabilizers, odor-control agents and antiseptics ("Standard Handbook of Lubrication Engineering," chapter 14, "Lubricant Additives" by C. M. Larson and R. Larson, McGraw-Hill Book Co., New York, 1968). The lubricant additives may contain among other things compounds of barium, calcium, phosphorus, sulfur, chromium, iron, zinc, lead, molybdenum, magnesium, silicon, chlorine, copper graphite as well as polymers and soap-like compounds. The amount and the type of additives used is dependent upon the intended use of the lubricant.

In order to satisfactorily incorporate these solid additives into the hexafluoropropylene oxide fluids, stable dispersions of the solid in the fluid must be formed. As discussed previously, the stable dispersion of such solids in polyfluorinated fluids has heretofore been unsatisfactory since an effective dispersing agent was unknown.

It has now been found that stable dispersions of solids in polyfluorinated fluids, i.e., hexafluoropropylene oxide fluids having the formula $$R_fO[CF(CF_3)CF_2O]_nCF(CF_3)X$$

wherein $R_f$ is a perfluoroalkyl having from 1 to 6 carbon atoms, $n$ is from 2 to about 40 and X is H or F may be formed by dispersing the selected solid in the hexafluoropropylene oxide fluid by any known means in the presence of a hexafluoropropylene oxide acid dispersing agent having the formula $R'_fO[CF(CF_3)CF_2O]_yCF(CF_3)COOH$ wherein $R'_f$ is a perfluoroalkyl group having from 1 to 6 carbon atoms and $y$ is from 3 to about 40.

The temperature and pressure at which the dispersing is effected is not critical as long as the hexafluoropropylene oxide fluid is in the liquid state and may be at room temperature and atmospheric pressure. In order to effect dispersion of the solid in the hexafluoropropylene oxide fluid, the size of the solid particles should be no more than about 40 microns in diameter since solids having a particle size of greater than about 50–60 microns diameter would probably not form stable dispersions due to the sheer mass of the individual particles. The amount of the solid that can be dispersed in the polymeric hexafluoropropylene oxide fluids depends upon the subdivision of the solid particles. When the average diameter of the solids is about 30 microns, a dispersion containing about 10% by weight of solid can be obtained while increasingly larger amounts of solid can be dispersed with the decreasing size of the solid particles. The solid additives will, however, normally be added in such an amount as to be from about 0.05 to about 10% by weight of the total dispersion with a particle size of from 1 to about 40 microns diameter and the amount of hexafluoropropylene oxide fluid used will be from about 70 to 99.9% by weight of the total dispersion.

Acids useful as dispersing agents in the process of the present invention have the formula $$R'_fO[CF(CF_3)CF_2O]_yCF(CF_3)COOH$$

wherein $R'_f$ is a perfluoroalkyl group of 1 to 6 carbon atoms and $y$ is from 3 to about 40. The preferred acid has an $R_f$ of $CF_3CF_2CF_2-$, and the preferred value of $y$ is chosen such that the numerical value of $y$ is the same as the numerical value of $n$ of the polymeric hexafluoropropylene oxide fluid represented by the formula $$R_fO[CF(CF_3)CF_2O]_nCF(CF_3)X$$

as described above. These acids are strong fluorocarbon acids and can undergo all of the typical reactions of strong carboxylic acids such as salt formation, amide formation and the like. These acids may be readily prepared by hydrolyzing the acyl fluoride $$R'_fO[CF(CF_3)CF_2O]_nCF(CF_3)COF$$

as in U.S. 3,250,808. The amount of polymeric hexafluoropropylene oxide acid used must be sufficient to effect and maintain the desired stable dispersion, normally from about 0.005 to about 20% by weight of the acid is utilized.

A unique and valuable feature of the present invention is, however, that the polymeric hexafluoropropylene oxide fluids and the polymeric hexafluoropropylene oxide acid dispersing agent have almost identical structures and compositions, differing only in the end-groups, so that almost any ratio of the dispersing agent to the fluid may be used without any appreciable loss in the fluid characteristics or stability.

The resultant stable dispersion consists essentially of (a) From about 0.05 to about 10% by weight of the select solid additive having a particle size of from about 1 micron to about 40 microns, (b) From about 70 to 99.9% by weight of a polymeric hexafluoropropylene oxide fluid having the formula $$R_fO[CF(CF_3)CF_2O]_nCF(CF_3)X$$

wherein $R_f$ is a perfluoroalkyl group having from 1 to 6 carbon atoms, $n$ is from 2 to about 40 and X is hydrogen or fluorine, and (c) From about 0.005 to 20% by weight of a dispersing agent having the formula $$R'_fO[CF(CF_3)CF_2O]_yCF(CF_3)COOH$$

wherein $R'_f$ is a perfluoroalkyl radical having from 1 to 6 carbon atoms and $y$ is from 3 to about 40.

The preferred $R_f$ and $R'_f$ group in both the polymeric hexafluoropropylene oxide fluid and the polymeric hexafluoropropylene oxide acid dispersing agent is $$CF_3CF_2CF_2-$$

Some solids which may be dispersed are, e.g., metal oxides such as $Fe_2O_3$, $Fe_3O_4$, $Cr_2O_3$, $Cu_2O$, and $CaO$, metal sulfide such as $MoS_2$, salt such as $MgSO_4$ and inert solids such as carbon and graphite. As has been stated previously, however, the particular solid additive utilized will be determined by the intended use of the dispersion. If for example it is desired to increase the lubricity of the hexafluoropropylene oxide fluid, then a solid lubricant may be added. Solid lubricants include such compounds as molybdenum sulfide, silver sulfide, lead iodide, graphite, mica and the like. In Trans. A.S.M.E., 67, 51–56 (1945) the frictional properties of various lubricants and particularly of turbine oils with solid lubricants at high pressures are discussed. Practical consideration dictates that a lubricant system comprising a fluid lubricant and a solid lubricant be a stable dispersion of the solid lubricant in the fluid lubricant so that the solid lubricant does not aggregate and separate and that is some separation occurs on prolonged storage, redispersion is readily accomplished. Thus the dispersions of this invention are particularly effective.

If the desired effect is an increased alkaline reserve of the hexafluoropropylene oxide fluid, then a solid alkaline material such as calcium oxide or the like would be used. These solid alkaline materials can effectively neutralize acidic corrosion agents arising from, e.g., combustion of fuels, oxidation of lubricants, which if allowed to accumulate can corrode the metal surfaces.

If it is desirable to increase the resistance of the hexafluoropropylene oxide fluid to degradation by ultraviolet radiation, carbon may be the solid dispersed in the stable dispersion. As discussed previously, the polymeric hexafluoropropylene oxide fluids because of their outstanding physical and chemical properties, are particularly suitable for use as lubricants in severe environmental conditions. In certain of such applications, e.g., in space vehicles, the fluids must be protected from degradation brought about by ultraviolet radiation. As is well known in the art, stabilization of plastics from ultraviolet degradation may be effected by blending plastics such as polyethylene and polypropylene with carbon. Carbon or any other opaque solids which protect the plastics from ultraviolet degradation by effectively screening the ultraviolet radiation from the bulk of the substrate may likewise be used in the stable dispersions of this invention.

It should be pointed out that in the practice of this invention, mixtures of polymeric hexafluoropropylene oxide fluids may be used as well as mixtures of polymeric hexafluoropropylene oxide acid dispersing agents and mixtures of dispersed solids.

EXAMPLES

The following examples are intended to be merely illustrative of the invention and not in limitation thereof. Unless otherwise indicated, all quantities are by weight.

Examples 1–5

Dispersion of metallic oxides in hydro end capped polymeric hexafluoropropylene oxide fluid.—In these examples, commercially available finely divided ferric oxide $Fe_2O_3$, magnetite $Fe_3O_4$, chromic oxide $Cr_2O_3$, cuprous oxide $Cu_2O$ and calcium oxide $CaO$ having an average particle size of about 30 microns diameter were used as obtained. One gram of the metallic oxide, 15 ml. (25.8 g.) of polymeric hexafluoropropylene oxide fluid $$R_fO[CF(CF_3)CF_2O]_nCF(CF_3)X$$

wherein $R_f$ is $CF_3CF_2CF_2-$, $n=2$ and X=H and a designated amount of polymeric hexafluoropropylene oxide acid $R'_fO[CF(CF_3)CF_2O]_yCF(CF_3)COOH$ wherein $R'_f$ is $CF_3CF_2CF_2-$ and $y$ is 4 or 8 were mixed vigorously in a glass bottle. The results obtained are summarized in Table I below.

TABLE I.—METALLIC OXIDE DISPERSION IN POLYMERIC HEXAFLUORO PROPYLENE OXIDE FLUID

Fluids: $CF_3CF_2CF_2O[CF(CF_3)CF_2O]_2CFCF_3H$, 15 ml., 25.8g.
Acids: $CF_3CF_2CF_2O[CF(CF_3)CF_2O]_yCF(CF_3)COOH$

| Example | Metallic oxide | Wt. of oxide | Acid used | Wt. of acid (g.) | Observations |
|---|---|---|---|---|---|
| (1) | $Cu_2O$ | 1.0 | None | | Immediate precipitation. |
|  | $Cu_2O$ | 1.0 | $y=4$ | 0.005 | Stable dispersion.* |
|  | $Cu_2O$ | 1.0 | $y=8$ | 0.005 | Do. |
| (2) | $Cr_2O_3$ | 1.0 | None | | Immediate precipitation. |
|  | $Cr_2O_3$ | 1.0 | $y=4$ | 0.005 | Stable dispersion. |
|  | $Cr_2O_3$ | 1.0 | $y=8$ | 0.005 | Do. |
| (3) | $Fe_2O_3$ | 1.0 | None | | Immediate precipitation. |
|  | $Fe_2O_3$ | 1.0 | $y=4$ | 0.005 | Stable dispersion. |
|  | $Fe_2O_3$ | 1.0 | $y=8$ | 0.005 | Do. |
| (4) | $Fe_3O_4$ | 1.0 | None | | Immediate precipitation. |
|  | $Fe_3O_4$ | 1.0 | $y=4$ | 0.005 | Stable dispersion. |
|  | $Fe_3O_4$ | 1.0 | $y=8$ | 0.005 | Do. |
| (5) | $CaO$ | 1.0 | None | | Immediate precipitation. |
|  | $CaO$ | 1.0 | $y=22$ | 1.00 | Stable dispersion. |

*Stable dispersion indicates that the dispersion is still stable after one week at room temperature.

The metal oxides dispersed in the foregoing examples have densities of about 5.7 while the dispersing fluid has a density of 1.7.

Example 6

This example shows that it also is possible to prepare stable dispersion of a solid wherein the dispersed solid is lighter than the dispersing fluid. The dispersions were prepared as in Examples 1–5. The results obtained are shown in Table II below.

TABLE II.—CARBON DISPERSION IN POLYMERIC HEXAFLUOROPROPYLENE OXIDE FLUID

Fluid: $CF_3CF_2CF_2O[CF(CF_3)CF_2O]_2CF(CF_3)H$
Acid: $CF_3CF_2CF_2O[CF(CF_3)CF_2O]_8CF(CF_3)COOH$
Carbon: "Neo Spectra Mark II Carbon" (Columbia Carbon Co.)

| Wt. of carbon (g.) | Vol. of fluid (ml.) | Wt. of acid (g.) | Observations |
|---|---|---|---|
| .05 | 100 | None | Separated in 30 minutes. |
| .05 | 100 | 0.01 | Stable dispersion.* |
| .05 | 100 | 0.10 | Do. |

*Stable dispersion indicates that the dispersion is stable after two weeks at room temperature.

Other carbons such as "Darco" (Atlas Chem. Ind.), "Nuchar" (West Virginia Pulp and Paper Co.), and "Norit" (American Norit Co.) of particle size 1–20 microns were also dispersed as above with similar results.

Examples 7–10

Dispersion of solids in fluoro end capped polymeric hexafluoropropylene oxide fluid.—Commercially available finely divided calcium oxide, CaO, molybdenum sulfide $MoS_2$, magnetite $Fe_3O_4$ and magnesium sulfate $MgSO_4$ having an average particle size of about 30 microns were used as obtained. One gram of the solid, 30 ml. of the polymeric hexafluoropropylene oxide fluid $R_fO[CF(CF_3)CF_2O]_nCF(CF_3)X$ wherein $R_f$ is $$CF_3CF_2CF_2-,$$

$n$ is about 28 and X is F and 2 g. of polymeric hexafluoropropylene oxide acid ($y=22$) were mixed vigorously in a glass bottle. The amount of acid dispersing agent used is not indicative of the amount required but an arbitrary amount used for convenience. The results obtained are shown in Table III below.

TABLE III.—SOLID DISPERSION IN POLYMERIC HEXAFLUOROPROPYLENE OXIDE FLUID

Fluid: $CF_3CF_2CF_2O[CF(CF_3)CF_2O]_{28}CF_2CF_3$, 30 ml., 50 g.
Acid: $CF_3CF_2CF_2O[CF(CF_3)CF_2O]_{y-22}CF(CF_3)COOH$

| Example | Solid | Wt. of solid | Wt. of acid used | Observations |
|---|---|---|---|---|
| (7) | CaO | 1.0 | None | Immediate precipitation. |
|  | CaO | 1.0 | 2.5 | Stable dispersion.* |
| (8) | $MoS_2$ | 1.0 | None | Immediate precipitation. |
|  | $MoS_2$ | 1.0 | 2.5 | Stable dispersion. |
| (9) | $Fe_3O_4$ | 1.0 | None | Immediate precipitation. |
|  | $Fe_3O_4$ | 1.0 | 2.5 | Stable dispersion. |
| (10) | $MgSO_4$ | 1.0 | None | Immediate precipitation. |
|  | $MgSO_4$ | 1.0 | 2.5 | Stable dispersion. |

*Stable dispersion indicates that the dispersion is still stable after one week at room temperature. In the above examples the dispersions after one week were still completely opaque to light.

Example 11

Alkaline reserve in polymeric hexafluoropropylene oxide fluid.—Fifty ml. of a stable dispersion of the calcium oxide prepared in Example 7 was placed in a 200 ml. beaker containing a magnetic stirring bar. Fifty ml. of water was placed on the top of the polymeric hexafluoropropylene oxide fluid. The magnetic stirring bar was allowed to rotate slowly so that the fluid interphase was not disturbed appreciably. Gaseous hydrogen chloride was introduced into the polymeric hexafluoropropylene oxide phase at the rate of approximately 2–3 bubbles per second. It was found that the aqueous phase was only slightly acidic after 10 minutes and that only after about 15 minutes was the aqueous phase very acidic.

When a mixture of finely divided calcium oxide and the polymeric hexafluoropropylene oxide fluid without the dispersing acid was substituted for the stable calcium oxide dispersion, the aqueous phase became acidic in a matter of few seconds. When the polymeric hexafluoropropylene oxide fluid alone was substituted for the stable calcium oxide dispersion, the aqueous phase became strongly acidic immediately.

This example illustrates that by dispersing solids which can effectively neutralize acidic products, the accumulation of such acidic products is eliminated and thus corrosion of metal surfaces is prevented. Other acid neutralizing solids such as alkali metal oxides and other alkaline earth metal oxides may be used with equal efficiency.

Example 12

Lubricity enhancement of polymeric hexafluoropropylene oxide fluid.—This example illustrates enhancement of lubricity of polymeric hexafluoropropylene oxide fluid at high temperatures and pressure by a dispersion of a solid lubricant in the fluid lubricant. The test was carried out in a Four-Ball Wear Test Machine. A complete description and the operation of the Four-Ball Machine may be found in "Standard Handbook of Lubrication Engineering," J. J. O'Connor, editor, McGraw-Hill Book Co., 1968, p. 27-4. In the test three of the steel balls are clamped in contact as in an equilateral triangle. The fourth ball is held in a rotating chuck and is in contact with each of the stationary balls. Specified load is applied through a lever system which pushes the three stationary balls upward against the rotating ball. The lubricant under test covers the stationary balls. After the test which is run for a specified time at specified temperature, pressure and rotation, the stationary balls are examined for wear, expressed in average wear spot diameter in millimeters. The results of Four-Ball Wear Test with fluoro end capped polymeric hexafluoropropylene oxide fluid of average molecular weight of 5000 (i.e., value of $n$ of 28.3) and a stable dispersion of the molybdenum sulfide prepared in Example 8 are shown in Table IV below.

TABLE IV.—WEAR TEST ON FOUR-BALL WEAR TESTER (Conditions: 1 hours at 400° F. (204° C.), 40 kg. load, 600 r.p.m., using 52100 steel balls)

|  | Average wear spot diameter, mm. |
|---|---|
| $C_3F_7O[CF(CF_3)CF_2O]_nCF_2CF_3$ | 1.5–1.6 |
| Stable dispersion of $MoS_2$ in above fluid (Example 8) | 0.88 |

The above results indicate that with a solid lubricant, $MoS_2$, dispersed in the polymeric hexafluoropropylene oxide fluid, the average area of the wear spot is reduced to approximately one quarter of that of the fluid lubricant itself.

The foregoing detailed description has been given for clarity of understandinng only and no unnecessary limitations are to be understood therefrom. The invention is not limited to exact details shown and described for obvious modification will occur to one skilled in the art.

The embodiments of the invention in which an exclusive property or privilege is claimed are defined as follows:

1. Stable dispersions consisting essentially of
   (a) from about 0.05 to about 10% by weight of a solid lubricant additive having a particle size of from about 1 micron to about 40 microns,
   (b) from about 70 to 99.9% by weight of a polymeric hexafluoropropylene oxide fluid having the formula $R_fO[CF(CF_3)CF_2O]_nCF(CF_3)X$ wherein $R_f$ is a perfluoroalkyl group having from 1 to 6 carbon atoms, $n$ is from 2 to about 40 and X is hydrogen of fluorine, and
   (c) from about 0.005 to 20% by weight of a dispersing agent having the formula $$R'_fO[CF(CF_3)CF_2O]_yCF(CF_3)COOH$$

wherein $R'_f$ is a perfluoroalkyl radical having from 1 to 6 carbon atoms and $y$ is from 3 to about 40.

2. Stable dispersions according to claim 1 wherein $R_f$ is $CF_3CF_2CF_2-$.

3. Stable dispersions according to claim 1 wherein $R'_f$ is $CF_3CF_2CF_2-$.

4. Stable dispersions according to claim 1 wherein both $R_f$ and $R'_f$ are $CF_3CF_2CF_2-$.

5. Stable dispersions according to claim 4 wherein $n$ is 2 and $y$ is 4.

6. Stable dispersions according to claim 4 wherein $n$ is 2 and $y$ is 8.

7. Stable dispersions according to claim 4 wherein $n$ is 28 and $y$ is 22.

8. Stable dispersions according to claim 4 wherein the numerical value of both $n$ and $y$ is the same.

9. A stable dispersion according to claim 7 wherein the solid additive is calcium oxide.

10. A stable dispersion according to claim 7 wherein the solid additive is molybdenum sulfide.

References Cited
UNITED STATES PATENTS

| | | | |
|---|---|---|---|
| 3,432,432 | 3/1969 | Dreher | 252—25 |
| 3,250,808 | 5/1966 | Moore et al. | 252—25 |
| 3,242,218 | 3/1966 | Miller | 252—54 |
| 3,214,478 | 10/1965 | Milian | 252—54 |
| 2,676,925 | 4/1954 | Lindstrom et al. | 252—25 |
| 2,751,352 | 6/1956 | Bondi | 252—25 |
| 3,306,854 | 2/1967 | Gumprecht | 252—389 |
| 3,384,581 | 5/1968 | Peace | 252—25 |
| 3,399,145 | 8/1968 | Martinek et al. | 252—25 |
| 3,464,854 | 9/1969 | Bolger | 252—25 |
| 3,597,359 | 8/1971 | Smith | 252—389 |
| 3,367,868 | 2/1968 | Skehan | 252—54 |

DANIEL E. WYMAN, Primary Examiner

I. VAUGHN, Assistant Examiner

U.S. Cl. X.R.

252—54, 54.6